(12) United States Patent
Michaud

(10) Patent No.: US 6,485,820 B1
(45) Date of Patent: Nov. 26, 2002

(54) DURABLE BELT DEVICE

(76) Inventor: Gerard Michaud, 115, St-Denis, St-Lambert, QBC (CA), J4P 2G1

( * ) Notice: Subject to any disclaimer, the term of this patent is extended or adjusted under 35 U.S.C. 154(b) by 0 days.

(21) Appl. No.: 09/986,824

(22) Filed: Nov. 13, 2001

(51) Int. Cl.[7] .............................................. B32B 25/10
(52) U.S. Cl. ................. 428/295.1; 428/295.4; 428/359; 428/364; 428/77; 428/96; 428/131; 428/294.7
(58) Field of Search ................ 428/297.4, 298.1, 428/43, 323, 295.1, 295.4, 294.7, 359, 364, 77, 96, 131

(56) References Cited

U.S. PATENT DOCUMENTS

| | | | |
|---|---|---|---|
| 3,675,704 A | * 7/1972 | Marzocchi et al. | ......... 152/361 |
| 4,548,102 A | * 10/1985 | Di Rocco et al. | ............. 81/15.7 |
| 5,685,417 A | 11/1997 | Hasegawa et al. | |
| 5,788,595 A | 8/1998 | Beck | |
| 6,234,305 B1 | * 5/2001 | Brown et al. | ............. 198/844.2 |

* cited by examiner

*Primary Examiner*—Merrick Dixon

(57) ABSTRACT

A durable belt device includes an outer layer made out of a rubber based material and an inner layer that includes at least one reinforcing ply of tear-resistant scrim fabric located between opposed surfaces thereof and a multiplicity of needle fibers that run substantially transversely and perpendicularly through the reinforcing ply and protrude out from at least one surface of the inner layer. A bonding agent forms an intermediate layer that secures the outer layer to the one surface of the inner layer such that the fibers at least partially extend therein.

15 Claims, 1 Drawing Sheet

DURABLE BELT DEVICE

FIELD OF THE INVENTION

The present invention relates to belt device, and more specifically to a belt device used in high speed machines for handling corrugated cardboards or the like.

BACKGROUND OF THE INVENTION

Belts of different types, shapes, and other features are being used in different machines depending on the application and the product handled thereon.

In high-speed conveyors and/or machines such as the well known folder-gluer types, wide variety of belts are required. Depending on the different operating conditions such as speed, temperature, humidity, time, chemical nature of the product and the like, different belts are considered.

When handling paperboard blanks with glue thereon at high speed, serious abrasion wear occurs to the conveyor belts. Typical multilayer belts need to be replaced at relatively short intervals of a few months after undergoing either delamination problems, stretching problems, adherence problems with the product, or the like. Furthermore, the time required to change one of these belts is quite significant (few hours) and forces to stop the whole production process which costs a lot of revenue to the owner of the machine, not even counting the last part of the production that might need to be rejected because of defects.

OBJECTS OF THE INVENTION

It is therefore a general object of the present invention to provide an improved durable belt device that obviates the above mentioned disadvantages.

The belt device of the present invention has the advantage of being long lasting, more than four times today's more resistant available belt product for an equivalent use, without any early sign of delamination or other damage.

Another advantage of the present invention is that the belt is simple of construction.

Other objects and advantages of the present invention will become apparent from a careful reading of the detailed description provided herein, within appropriate reference to the accompanying drawings.

SUMMARY OF THE INVENTION

The present invention provides for a durable belt device that comprises:
  a first layer defining generally opposed first and second surfaces, said first layer including a rubber based material;
  a second layer defining generally opposed first and second surfaces, said second layer including at least one reinforcing ply of tear-resistant scrim fabric extending between said first and second surfaces thereof in a direction substantially parallel thereto, said second layer including a multiplicity of needle fibers extending through said reinforcing ply and between said first and second surfaces of said second layer in a direction substantially perpendicular thereto, said fibers protruding out from at least said first surface of said second layer; and
  a bonding agent forming an intermediate layer securing said first surface of said first layer to said first surface of said second layer, whereby said fibers at least partially extend into said intermediate layer.

Preferably, the fibers are spaced apart and substantially parallel relative to each other and are long single strands running back and forth through said at least one reinforcing ply of scrim fabric.

Preferably, the bonding agent is a rubber type cement, such as a chloroprene polymer based hardener mixing with trichloroethylene based solvent.

Preferably, the fibers of said second layer protrude out from both said first and second surfaces thereof.

Preferably, the at least one reinforcing ply of said second layer is embedded into a rubber based matrix and defines first and second rubber plies separated by said reinforcing ply adjacent said first and second surfaces of said second layer, respectively, said fibers running through said rubber based matrix and extending into at least said first rubber ply.

Preferably, the tear-resistant scrim fabric is woven polyester material and said fibers are polyester material.

Preferably, the second layer is antistatic.

Preferably, the belt device further includes perforations extending therethrough, said perforations extending from said second surface of said first layer to said second source of said second layer in a direction generally perpendicular thereto, whereby said device being a vacuum transfer belt device.

Preferably, the first layer includes a plurality of adjacent plies successively bonded to each other, each of said plurality of plies defining generally opposed first and second surfaces and including a rubber based material, said ply of said plurality of adjacent plies adjacent said first surface of said first layer being of rubber based material.

BRIEF DESCRIPTION OF THE DRAWINGS

In the annexed drawings, like reference characters indicate like elements throughout.

DETAILED DESCRIPTION OF THE PREFERRED EMBODIMENTS

With reference to the annexed drawings the preferred embodiments of the present invention will be herein described for indicative purpose and by no means as of limitation.

Figure 1:
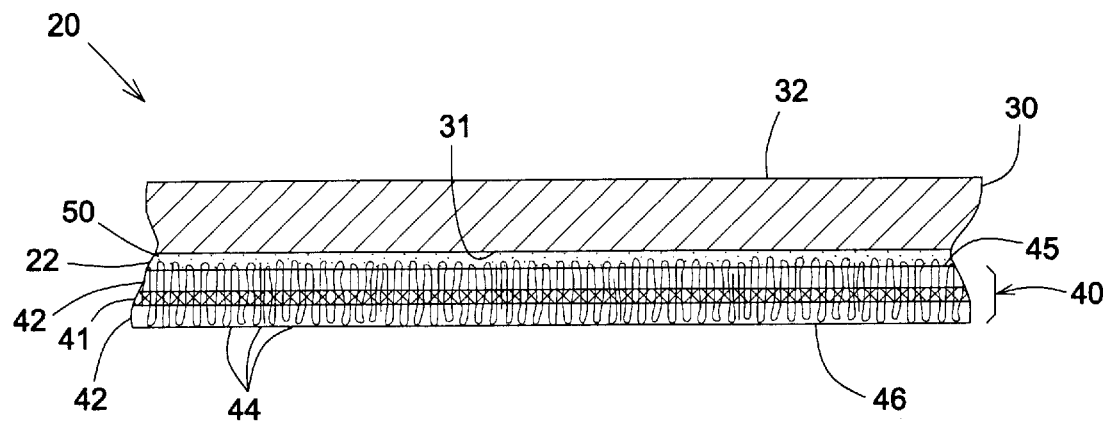
FIG. 1 is a side elevation cross-sectional view of an embodiment of a durable belt device according to the present invention.

Referring to FIG. 1, there is shown an embodiment 20 of a durable belt device according to the present invention that is usually used as a conveyor belt for folder-gluer type machines handling paperboard blanks, such as cardboards, corrugated cardboards and the like. Accordingly, the belt 20 needs to be tear-resistant, adherent, strong, non-stretchable, etc.

The device 20 includes a first outer layer 30 having at least its first inner 31 and second outer 32 surfaces, generally opposed to each other, including a rubber based or rubber-like material, preferably natural rubber, in order to provide a good adherence property of the outer surface 32 to avoid sliding of the blanks continuously carried thereon at very high speed twenty-four hours a day (24 h/day), for months without any interruption, and to enhance bonding characteristics of the inner surface 31.

A second inner layer 40 includes at least one reinforcing ply 41 of tear resistant textile or scrim fabric material, preferably woven polyester type material, with a multiplicity of needle fibers 44 that run substantially transversely there through in a direction substantially perpendicular to the plane defined by the second layer 40 so as to protrude from at least one surface 43 thereof, preferably from both first inner 46 and second outer 45 surfaces thereof, also generally opposed to each other. The fibers 44 are substantially parallel to each other and substantially perpendicular to the reinforcing ply 41, i.e. generally oriented in the direction of the thickness of the belt 20. The needle fibers 44 are either in the form of long single strands running back and forth through the scrim ply 41, as it is commonly manufactured, or in the form of individual short fibers 44 running through the scrim ply 41 and extending there from, to produce a felt like surface fabric. Eventually, the scrim ply 41 could be embedded in a rubber based matrix which forms rubber plies 42 with the needle fibers 44 running through the plies 42 and protruding out of the surfaces 45, 46 thereof.

A bonding agent 50 is used to form an intermediate layer 22 between the outer 30 and inner 40 layers of the belt 20. This intermediate layer 22 secures the inner surface 31 of the outer layer 30 to the outer surface 45 of the inner layer 40 and includes the needle fibers 44 at least partially extending therein and also preferably made out of polyester material. These needle fibers 44 significantly improve the resistance of the intermediate layer 22, and therefore the entire belt 20, against delamination at the interface with the inner layer 40 by extending into the intermediate layer 22 and significantly increasing the bonding surface area of the inner layer 40, in addition to the scrim ply 41 made out of polyester type material that offers a weak bond with the rubber based outer layer 30. The delamination is similarly prevented within the inner layer 40 between the scrim ply 41 and the rubber based plies 42 when the latter are thick enough to ensure a good bond interface with the inner layer 30. The scrim ply 41 and needle fiber 44 materials are preferably selected from the group comprising polyester, polyamide, aramid and/or cotton or any combination thereof, but any other material known in the art could be considered.

The bonding agent 50 is preferably a rubber type cement such as a chloroprene polymer based hardener mixed with a trichloroethylene based solvent that perfectly adheres to rubber based materials, preferably using a vulcanizing process. Obviously, as well known in the art, preparation cleaning and/or pre-vulcanizing of the surfaces to be bonded is required prior to bonding.

In order to make the belt 20 antistatic to prevent any charge built-ups that could cause damages to the machine and/or operators, the needle fibers 44 are preferably coated with or include an antistatic compound to be antistatic themselves.

Figure 2:
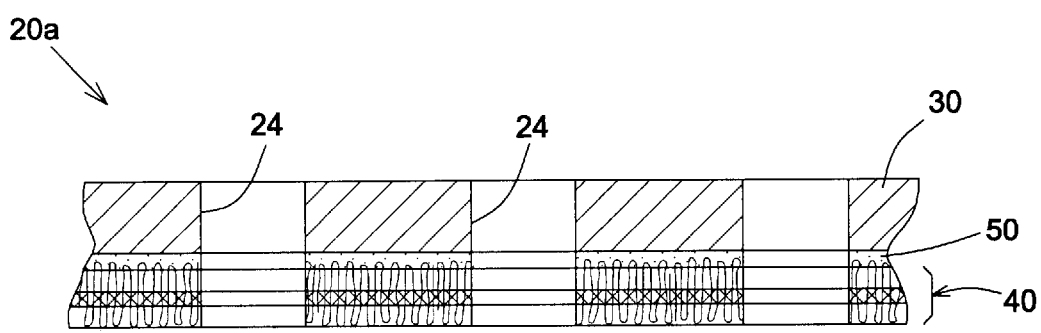
FIG. 2 is a view similar to FIG. 1, showing the embodiment with through perforations.

As seen in FIG. 2, the belt 20a can have transverse perforations 24 that extend through all the layers 22, 30, 40 defining the thickness of the ben 20a, to form a conventionally-called vacuum transfer belt 20a. The shape, preferably circular, size and quantity of these perforations 24 vary depending of the application of the belt 20a.

Although it is well known to include some dying agent into the composition of a layer 22, 30, 40 of a belt 20, the outermost layer 30 is usually colored or pigmented. For this reason, when the outer surface 32 of the outer layer 30 is colored, it is preferable that its inner surface 46 be uncolored to improve its adherence to the bonding agent and the fibers 44 of the inner layer 40.

Figure 3:
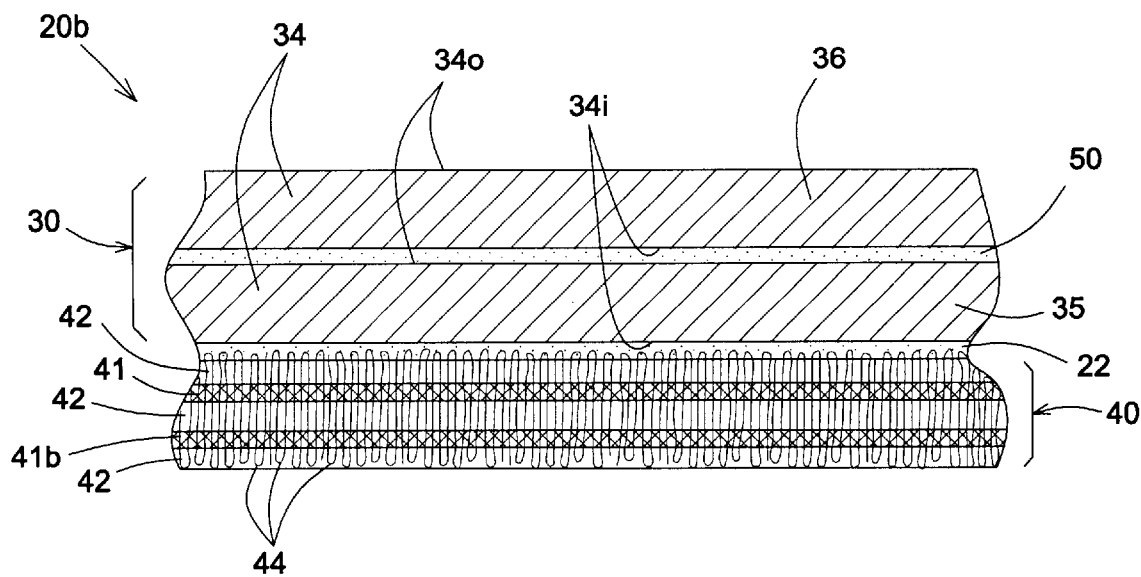
FIG. 3 is a view similar to FIG. 1, showing another embodiment with the outer layer constituted of more than one ply.

In such a case illustrated in FIG. 3, the outer layer 30 of the belt 20b includes a plurality of adjacent plies 34 successively bonded to each other the bonding agent 5D or any other suitable agent. Accordingly, each ply 34 has its opposite first inner 34i and second outer 34o surfaces including a rubber based or rubber-like material. Preferably, the innermost ply 35 is made out of natural rubber and is therefore generally black, while the outermost ply 36 is colored with a dying agent mixed therein during its manufacture.

Similarly, the inner layer 40 may include a second reinforcing scrim ply 41b which is secured to the other reinforcing ply 41 via the rubber plies 42 of the matrix embedding both of them 41, 41b and the needle fibers 44 running through both of them 41, 41b and protruding out from at least one surface 45 of the inner layer 40.

The belt device 20 of the present invention is also of a dirt-repellent outer surface 32 characteristic coming from the natural rubber material present thereon. Conventional mechanical fasteners (not shown) or endless type hot or cold bonding are perfectly suitable for the closing off of the present belt 20 into a usual loop shape.

Although the present durable belt device has been described with a certain degree of particularity, it is to be understood that the disclosure has been made by way of example only and that the present invention is not limited to the features of the embodiments described and illustrated herein, but includes all variations and modifications within the scope and spirit of the invention as hereinafter claimed.

I claim:

1. A durable belt device, said belt device comprising:
    a first layer defining generally opposed first and second surfaces, said first layer including a rubber based material;
    a second layer defining generally opposed first and second surfaces, said second layer including at least one reinforcing ply of tear-resistant scrim fabric extending between said first and second surfaces thereof in a direction substantially parallel thereto, said second layer including a multiplicity of needle fibers extending through said reinforcing ply and between said first and second surfaces of said second layer in a direction substantially perpendicular thereto, said fibers protruding out from at least said first surface of said second layer; and
    a bonding agent forming an intermediate layer securing said first surface of said first layer to said first surface of said second layer, whereby said fibers at least partially extend into said intermediate layer.

2. The belt device of claim 1 wherein said fibers are spaced apart and substantially parallel relative to each other.

3. The belt device of claim 1 wherein said bonding agent is a rubber type cement.

4. The belt device of claim 3 wherein said rubber type cement is chloroprene polymer based hardener mixing with trichloroethylene based solvent.

5. The belt device of claim 1 wherein said fibers of said second layer protrude out from both said first and second surfaces thereof.

6. The belt device of claim 1 wherein said at least one reinforcing ply of said second layer is embedded into a rubber based matrix and defines first and second rubber plies separated by said reinforcing ply adjacent said first and second surfaces of said second layer, respectively, said fibers running through said rubber based matrix and extending into at least said first rubber ply.

7. The belt device of claim 1 wherein said tear-resistant scrim fabric is woven polyester material and said fibers are polyester material.

8. The belt device of claim 1 wherein said second layer is antistatic.

9. The belt device of claim 1, further including perforations extending therethrough, said perforations extending from said second surface of said first layer to said second surface of said second layer in a direction generally perpendicular thereto, whereby said device being a vacuum transfer belt device.

10. The belt device of claim 9 wherein said perforations are of a generally circular shape.

11. The belt device of claim 1 wherein said first layer includes a plurality of adjacent plies successively bonded to each other, each of said plurality of plies defining generally opposed first and second surfaces and including a rubber based material, said ply of said plurality of adjacent plies adjacent said first surface of said first layer being of rubber based material.

12. The belt device of claim 11 wherein said ply of said plurality of adjacent plies adjacent said second surface of said first layer is of rubber based material and includes dying agent therein.

13. The belt device of claim 11 wherein said at least one reinforcing ply of said second layer is embedded into a rubber based matrix and defines first and second rubber plies separated by said reinforcing ply adjacent said first and second surfaces of said second layer, respectively, said fibers running through said rubber based matrix and extending into at least said first rubber ply.

14. The belt device of claim 1 wherein said needle fibers are long single strands running back and forth through said at least one reinforcing ply of scrim fabric.

15. A durable belt device, said belt device comprising:

a first layer defining generally opposed first and second surfaces, said first layer including a rubber based material;

a second layer defining generally opposed first and second surfaces, said second layer including at least one reinforcing ply of tear-resistant scrim fabric extending been said first and second surfaces thereof in a direction substantially parallel thereto, said second layer including a multiplicity of needle fibers extending through said reinforcing ply and between said first and second surfaces of said second layer in a direction substantially perpendicular thereto, said fibers protruding out from said first and second surfaces of said second layer; and a bonding agent forming an intermediate layer securing said first surface of said first layer to said first surface of said second layer, whereby said fibers at least partially extend into said intermediate layer.

* * * * *